UNITED STATES PATENT OFFICE.

HEINRICH OTTO BRANDT, OF MANCHESTER, ENGLAND.

TUBULAR SLEEVE OR COVER FOR THE ROLLERS OF WRINGING, SCOURING, WASHING, PAPER-MAKING, AND SIMILAR MACHINES.

1,208,471.     Specification of Letters Patent.     Patented Dec. 12, 1916.

Application filed July 2, 1914. Serial No. 849,015.

*To all whom it may concern:*

Be it known that I, HEINRICH OTTO BRANDT, a British subject, residing at Manchester, county of Lancaster, England, have invented certain new and useful improvements in tubular sleeves or covers for the rollers of wringing, scouring, washing, paper-making, and similar machines, of which the following is a specification.

This invention relates to tubular sleeves, covers and blankets for the rollers of wringing, scouring, washing, paper making and like machines, and especially for the rollers of printing machines. Such sleeves, covers and blankets have been made by assembling wool or similar fiber on a suitable former and felting it into a seamless tubular sleeve or cover, as set forth in the U. S. Patent 744090, and also, by winding a small fleece strip or band of wool helically around an endless transport cloth so that the strips cross each other as shown in the U. S. Patent 872,867.

By my method I produce a seamless tubular sleeve or blanket for rollers having various qualities of advantage over those heretofore used and of which I am aware.

The roller blankets constructed in accordance with the present method have greater textile strength and are more durable, however possess the necessary resiliency for successful use on the rollers of printing machines. These blankets are also more porous than those which have been previously made and possess a more even surface than similar blankets which are constructed by other methods to obtain an article of great textile strength and durability.

In producing the blanket according to the present invention, I first apply to a former, a series of thin layers of wool fiber, and then wind over these latter layers of fiber a series of layers of narrow fleece strips or slivers of wool of required thickness, and finally surround the said wound strips of wool with an exterior layer or layers of wool fiber. Thus, the blankets are constructed of three distinct sections, the first being composed of a number of layers of broad fleece wool, the second or intermediate section being made of spirally wound slivers of wool and finally the outside section composed of a single or plurality of layers or broad fleece wool.

The layers may be of any thickness, to give the desired thickness of coucher jackets, covers or blankets. The three sections of material thus built up are felted together and subjected to a process of milling producing a coucher jacket, cover or blanket more porous than such made by either of the known methods, the additional porosity being a decided advantage and also one that will have less side shrinkage in use. In the process of felting, the edges of the spirally wound intermediate section felt into one another and into the two outer sections thereby adding to the strength of the material and leaving the blanket with perfectly smooth surfaces.

What I claim as my invention and desire to protect by Letters Patent is:—

1. A process for making tubular blankets for rollers, consisting of first laying on a former a section of wool fiber, then winding upon said section narrow sliver strips of wool, then placing an outer section of wool fiber upon and around said wound strips, and then felting said sections and strips together, so that the edges of the wound strips felt one into the other and into the two outer sections, substantially as described.

2. As a new article of manufacture, the herein-described seamless blanket for rollers comprising, three distinct sections, the first section being composed of a plurality of layers of a broad fleece of wool fiber, the second or intermediate section being composed of a plurality of layers of spirally wound slivers of wool, and the third or outer section being composed of a plurality of layers of a broad fleece of wool fiber, all of said sections being felted together to produce a homogeneous mass, substantially as described.

In testimony whereof I have hereunto set my hand in presence of two subscribing witnesses.

HEINRICH OTTO BRANDT.

Witnesses:
   SIGMUND FREUND,
   A. SCHMIDT.

*Copies of this patent may be obtained for five cents each, by addressing the "Commissioner of Patents, Washington, D. C."*